US012469250B2

(12) United States Patent
Zimmerle et al.

(10) Patent No.: US 12,469,250 B2
(45) Date of Patent: Nov. 11, 2025

(54) PLUME IDENTIFICATION ALGORITHM FOR OPTICAL NATURAL GAS EMISSIONS IMAGING

(71) Applicant: Colorado State University Research Foundation, Fort Collins, CO (US)

(72) Inventors: Daniel Zimmerle, Fort Collins, CO (US); Marcus Martinez, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 75 days.

(21) Appl. No.: 18/559,779

(22) PCT Filed: Oct. 6, 2022

(86) PCT No.: PCT/US2022/077715
§ 371 (c)(1),
(2) Date: Nov. 8, 2023

(87) PCT Pub. No.: WO2023/060208
PCT Pub. Date: Apr. 13, 2023

(65) Prior Publication Data
US 2024/0242466 A1    Jul. 18, 2024

Related U.S. Application Data

(60) Provisional application No. 63/252,659, filed on Oct. 6, 2021.

(51) Int. Cl.
*G06V 10/36*    (2022.01)
*G06V 10/30*    (2022.01)
(Continued)

(52) U.S. Cl.
CPC .............. *G06V 10/36* (2022.01); *G06V 10/30* (2022.01); *G06V 10/34* (2022.01); *G06V 10/766* (2022.01); *G06V 20/40* (2022.01); *G01M 3/04* (2013.01)

(58) Field of Classification Search
CPC ........ G06V 10/36; G06V 10/30; G06V 10/34; G06V 10/766; G06V 20/40; G06V 10/143;
(Continued)

(56) References Cited

U.S. PATENT DOCUMENTS

| 9,613,410 B2 | 4/2017 | Strandamar |
| 10,359,359 B2 | 7/2019 | Wang et al. |

(Continued)

OTHER PUBLICATIONS

International Search Report and Written Opinion, as issued in connection with International Patent Application No. PCT/US2022/077715, dated Dec. 29, 2022, 7 pgs.

(Continued)

*Primary Examiner* — Michael Horabik
*Assistant Examiner* — Ahmed A Nasher
(74) *Attorney, Agent, or Firm* — Maschoff Brennan

(57) ABSTRACT

A method may include receiving video data that includes frames representative of infrared radiation within a scene. Each of the frames may include pixels The method may also include identifying pixels within the frames that correspond to a gas plume released by a gas source within the scene based on the infrared radiation. In addition, the method may include determining a size of the gas plume within each frame based on the identified pixels.

16 Claims, 7 Drawing Sheets

(51) Int. Cl.
*G06V 10/34* (2022.01)
*G06V 10/766* (2022.01)
*G06V 20/40* (2022.01)
*G01M 3/04* (2006.01)

(58) Field of Classification Search
CPC ........ G06V 10/273; G01M 3/04; G01M 3/38; G01J 5/0014; G01J 5/026; G01J 2005/0077; G01N 2021/3531; G01N 21/3504; G06T 2207/10016; G06T 2207/10048
See application file for complete search history.

(56) References Cited

U.S. PATENT DOCUMENTS

| | | | |
|---|---|---|---|
| 10,810,858 B2 | 10/2020 | Israelsen | |
| 10,852,208 B2 | 12/2020 | Wang | |
| 11,468,538 B2 | 10/2022 | Whiting et al. | |
| 2014/0002667 A1 | 1/2014 | Cheben et al. | |
| 2018/0313748 A1* | 11/2018 | Asano | G01N 21/3504 |
| 2019/0154536 A1 | 5/2019 | Wang | |
| 2020/0043137 A1* | 2/2020 | He | G06F 18/28 |
| 2020/0082536 A1 | 3/2020 | Asano | |
| 2020/0124470 A1 | 4/2020 | Kester et al. | |
| 2021/0218909 A1 | 7/2021 | Schmidt et al. | |

OTHER PUBLICATIONS

Ravikumar et al., Are Optical Gas Imaging Technologies Effective for Methane Leak Detection?, Environmental Science & Technology, 2017, 51, ACS Publications, pp. 718-724.
Martinez, Marcus M., Development of a Plume Identification Algorithm from Optical Gas Imaging of Natural Gas Emissions that Requires No Human Intervention, 2020, 79 pgs.
Wang et al., Machine vision for natural gas methane emissions detection using an infrared camera, Applied Energy 257, 2020, 10 pgs.
Canadian Examination Report, as issued in connection with Canadian Application No. 3,218,624, dated Jan. 11, 2024, 5 pgs.
Canadian Examination Report, as issued in connection with Canadian Application No. 3,218,624, dated May 27, 2024, 4 pgs.
Response to Canadian Examination Report, as filed in connection with Canadian Application No. 3,218,624, dated Sep. 23, 2024, 12 pgs.
Canadian Notice of Allowance, as issued in connection with Canadian Application No. 3,218,624, dated Jun. 13, 2025, 1 pg.

* cited by examiner

PLUME IDENTIFICATION ALGORITHM FOR OPTICAL NATURAL GAS EMISSIONS IMAGING

CROSS-REFERENCE TO RELATED APPLICATION

This patent application claims the benefit of and priority to U.S. Provisional App. No. 63/252,659 filed Oct. 6, 2021, titled "PLUME IDENTIFICATION ALGORITHM FOR OPTICAL NATURAL GAS EMISSIONS IMAGING THAT REQUIRES NO HUMAN INTERVENTION," which is incorporated in the present disclosure by reference in its entirety.

FIELD

The embodiments discussed in the present disclosure are related to a plume identification algorithm for optical natural gas emissions imaging.

BACKGROUND

Unless otherwise indicated in the present disclosure, the materials described in the present disclosure are not prior art to the claims in the present application and are not admitted to be prior art by inclusion in this section.

Improvements in drilling technology for natural gas has expanded the production of natural gas in the United States (US). To reduce the release of natural gas (e.g., methane) into the atmosphere during production, an emission inspection of natural gas infrastructure in upstream and midstream sectors of the gas supply chain is performed. The emission inspection may be performed using gas detectors. Recently, however, optical gas imaging (OGI) technology has been approved as an alternative to gas detectors for performing the emission inspection. The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One or more embodiments of the present disclosure may include a method. A method may include receiving video data that includes frames representative of infrared radiation (IR) within a scene. Each of the frames may include pixels. The method may also include identifying pixels within the frames that correspond to a gas plume released by a gas source within the scene based on the IR. In addition, the method may include determining a size of the gas plume within each frame based on the identified pixels.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

Figure 1:
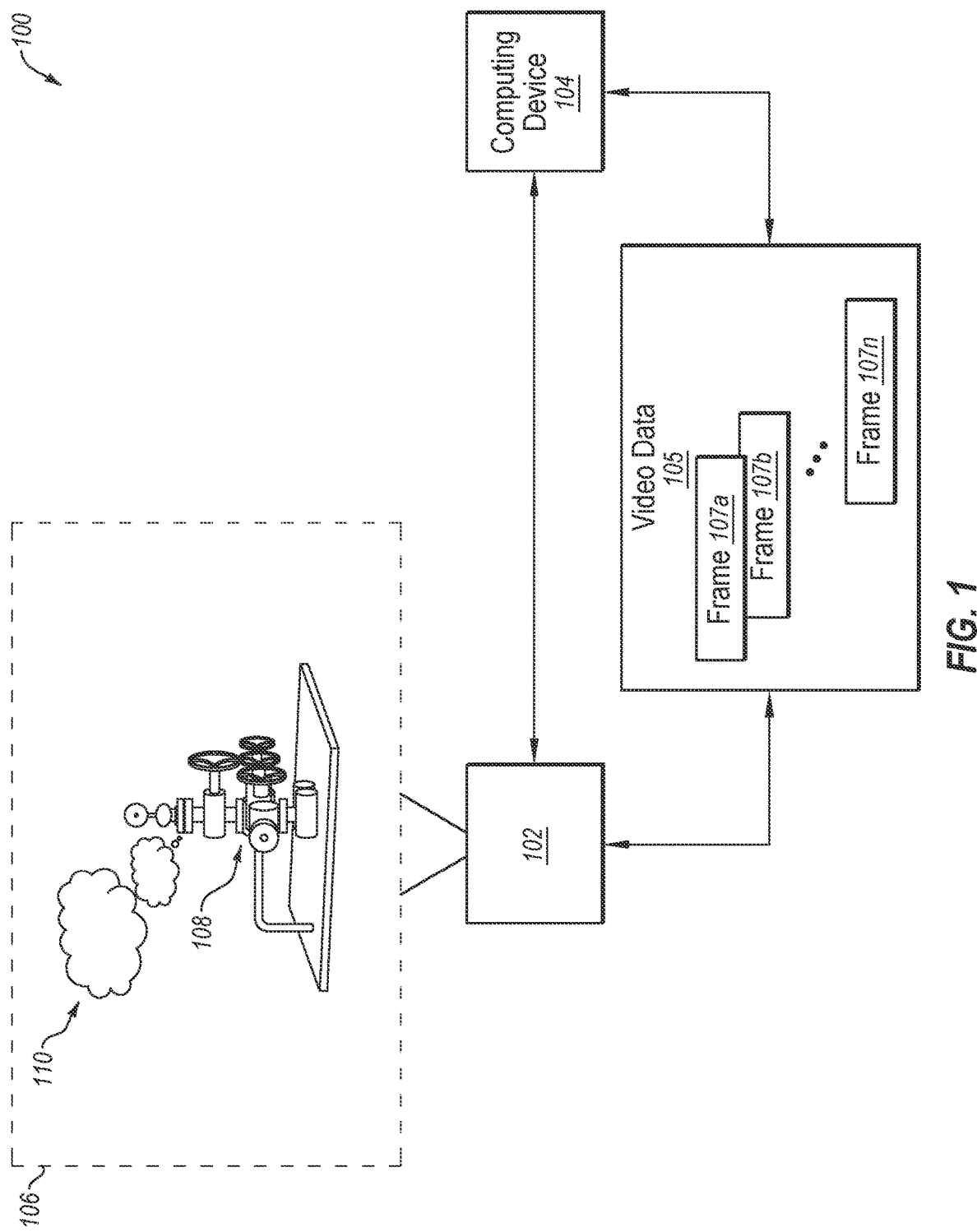
FIG. 1 illustrates a block diagram of an example operational environment to determine a probability of detection (POD) of a gas plume.

The OGI technology may include an IR video camera (generally referred to in the present disclosure as "camera") configured to detect IR (e.g., IR incident to a sensor of the camera) of a scene corresponding to a field of view (FOV) of the camera. In some embodiments, the camera may be configured to detect IR within a frequency band that corresponds to the temperature of natural gas and environments of the natural gas infrastructure. For example, the camera may be configured to detect IR within a frequency band equal to or between 3.2 and 3.4 micrometers ($\mu$m) in which methane may include a strong absorption line. In some embodiments, the camera may include a handheld camera.

The detected IR may include direct IR, reflected IR, transmitted IR, or some combination thereof. The direct IR may include IR transmitted by an object within the scene. The reflected IR may include IR reflected by an object within the scene. The transmitted IR may include IR emitted by an object within or background of the scene that traverses through a partially transparent object within the scene. The detected IR may be impacted by an emissivity, a reflectivity, a transmissivity, an environmental condition, an emission survey practice, an emission rate of the natural gas, a size of the gas plume in the scene, a temperature of the natural gas, a composition of the natural gas, or some combination thereof.

The camera may generate a photocurrent proportional to the detected IR. The camera may generate video data representative of the detected IR based on the photocurrent. The video data may include frames that are representative of the IR of the scene at different points in time. Each frame may include pixels and each pixel may correspond to a different location within the scene. Each of the pixels may be assigned a color that corresponds to the IR (e.g., a temperature) of the corresponding location within the scene. The video data may be displayed via a display to a user (e.g., a trained OGI operator) to cause the IR of the scene to be visible to the human eye. In some embodiments, methane within the scene may appear darker or lighter in the display than other objects within and/or the background of the scene depending on whether the methane includes an absorptive emission or an emissive emission when viewed in grayscale, respectively.

To perform the emission inspection, the user may position the camera relative to an infrastructure component of the natural gas supply line (e.g., a gas source). The camera may detect the IR of the scene and generate the video data. The user may view the display and determine if the gas plume is being emitted by the infrastructure component based on the display of the video data. If the gas plume (e.g., a natural gas emission) is visible in the display of the video data, the user may note the location of the gas plume, perform a repair to stop the gas plume, or some combination thereof.

In some OGI detection technologies, the detection of the gas plume may depend on the qualitative judgment of the user of the display of the video data. The qualitative judgment of the user may cause issues with replicability, extensibility, standardization, or some combination thereof of emission inspection studies using these OGI detection technologies. In addition, these OGI detection technologies may cause issues with automation of large test suites.

Some embodiments described in the present disclosure may use a frequency-based algorithm to determine the POD of the gas plume without the qualitative judgment of the user. A computing device may separate pixels within the video data corresponding to objects and/or the background of the scene from pixels within the video data corresponding to the gas plume. The computing device may use the video data, which may be representative of the detected IR during periods of time in which the gas plume is being emitted (e.g., an on state or a leaking state) and in which the gas plume is not being emitted (e.g., an off state or a not leaking state). The computing device may detect the gas plume by identifying high-frequency IR changes between the frames of various pixels (e.g., high-frequency changes in temperature due to motion of the gas plume during a period of time) as corresponding to the gas plume. In some embodiments, pixels that correspond to the high-frequency IR changes may include pixels that correspond to temperature changes at a rate equal to or greater than quarter of the frame rate of the camera (e.g., 0.25*(the frame rate of the camera)). For example, if the camera includes a frame rate of twelve frames per second, the pixels that correspond to the high-frequency IR changes may include pixels that correspond to temperature changes at a rate equal to or greater than three frames per second. In other embodiments, pixels that correspond to the high-frequency IR changes may include pixels that correspond to temperature changes at a rate equal to or greater than a tenth of the frame rate of the camera (e.g., 0.1*(the frame rate of the camera)). In addition, the computing device may identify low-frequency IR changes between the frames (e.g., low-frequency changes in temperature) of other pixels between to remove any pixels that correspond to other objects and/or the background of the scene.

The computing device may determine the POD of the gas plume based on the size of the gas plume relative to the size of the scene (e.g., the FOV of the camera). In some embodiments, the POD of the gas plume may be determined specific to the camera, the environment, a rate at which the natural gas is being emitted, or specific to any other appropriate factor.

The computing device may receive the video data from the camera. The video data may include frames representative of the IR within the scene. The computing device may identify pixels within the frames that correspond to the gas plume based on the IR within the scene. The computing device may also determine the size of the gas plume within each frame based on the identified pixels. In addition, the computing device may determine the POD of the gas plume within the scene by the user based on the size of the gas plume within each frame.

Some embodiments described in the present disclosure may determine conditions under which the camera properly functions to understand a leak detection efficacy of the camera. These and other embodiments described in the present disclosure may remove the human element from detection testing for scientific studies using the camera, alternative deployments of the camera, qualifying the camera for field use, or some combination thereof. Additionally or alternatively, some embodiments described in the present disclosure may provide a quantitative basis to evaluate when the gas plume is detectable using the camera to permit replicability, extensibility, standardization, or some combination thereof of emission inspection studies using OGI detection technologies.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

FIG. 1 illustrates a block diagram of an example operational environment 100 to determine the POD of a gas plume 110, in accordance with at least one embodiment described in the present disclosure. The environment 100 may include a camera (e.g., an IR camera) 102 and a computing device 104. The camera 102 may be communicatively coupled, electrically coupled, or some combination thereof to the computing device 104.

The camera 102 may be configured to generate video data 105 representative of IR detected within a scene 106. The camera 102 may include a sensor (not illustrated in FIG. 1) and the detected IR may be incident to the sensor. In some embodiments, the scene 106 may correspond to a FOV of the camera 102. The scene 106 may encompass an infrastructure component 108 and the gas plume 110. The infrastructure component 108 may include a component of the natural gas supply line.

The computing device 104, the camera 102, or some combination thereof may include a display (not illustrated in FIG. 1) to display the video data 105 to the user. In FIG. 1, a single camera 102 is illustrated and discussed for exemplary purposes. In some embodiments, any appropriate number of cameras may generate the video data 105. In addition, in FIG. 1, the camera 102 and the computing device 104 are illustrated as separate devices. In some embodiments, the camera 102 and the computing device 104 may include a single device (e.g., the camera 102 and the computing device 104 may be housed in a single housing).

The computing device 104 may convert the video data 105 to include frames 107a-n representative of the scene 106 over a period of time. In FIG. 1, the video data 105 includes a first frame 107a, a second frame 107b, and a Nth frame 107n (referenced collectively in the present disclosure as "frames 107"). As indicated by the ellipsis and the Nth frame 107n in FIG. 1, the video data 105 may include any appropriate number of frames 107. Each of the frames 107 may be representative of the detected IR at a different moment in time within the period of time. The camera 102 may generate the frames 107 based on a frame rate of the camera 102. For example, the camera 102 may generate the frames 107 at a frame rate equal to ten frames per second.

In some embodiments, the frames 107 may include an ON subset and an OFF subset. In these and other embodiments, the OFF subset may correspond to a portion of the period of time in which the infrastructure component 108 is not releasing the gas plume 110. In addition, in these and other embodiments, the ON subset may correspond to another portion of the period of time in which the infrastructure component 108 is releasing the gas plume 110.

The computing device 104 may receive the video data 105. The frames 107 may include a three-dimensional array of pixels. In some embodiments, the first dimension may include a horizontal direction (e.g., an i direction) of the pixels, the second dimension may include a vertical direction (e.g., a j direction) of the pixels, and the third dimension may include a time direction of the pixels (e.g., a k direction over the frames 107). Each pixel may include a color representative of the IR temperature detected at the corresponding location within the scene 106 by the camera 102. The computing device 104 may be configured to identify the pixels within each of the frames 107 that correspond to the gas plume 110 based on the detected IR to determine the POD of the gas plume 110 within the scene 106.

The computing device 104 may generate filtered frames by filtering out the pixels from the frames 107 that correspond to low-frequency IR changes (e.g., low-frequency IR changes of pixels between the frames 107). Each of the filtered frames may include filtered values. Each filtered value may correspond to a different pixel within the frames 107. The computing device 104 may filter out the pixels from the frames 107 that correspond to the low-frequency IR changes by setting the corresponding filtered values equal to zero.

The computing device 104 may calculate a signal strength value of each pixel based on the corresponding filtered values. In some embodiments, the computing device 104 may calculate the signal strength value of the pixels using a standard deviation of the filtered values over a subset of the filtered frames. For example, the computing device 104 may calculate the standard deviation of a current pixel over the current filtered frame and four additional filtered frames. In other embodiments, the computing device 104 may calculate the signal strength of the pixels using other metrics representative of a variability of the filtered values over a subset of the filtered frames. In addition, the computing device 104 may generate strength frames that include the signal strength values of the corresponding pixels. Each strength frame may correspond to a different frame of the frames 107.

In some embodiments, the computing device 104 may apply a blur filter to the strength frames to generate blurred frames. The blur filter may include a Gaussian blur filter. The blurred frames (e.g., the blurred values) may be representative of a smoothed version of the high-frequency IR changes within the scene 106. Each of the blurred frames may correspond to a different frame of the frames 107. In addition, each blurred frame may include the blurred values of the corresponding pixels.

The computing device 104 may compare each of the blurred values to a noise threshold value to generate noise frames that include noise values. Each of the noise frames may correspond to a different frame of the frames 107. In addition, each noise frame may include the noise values of the corresponding pixels. The computing device 104 may generate a matrix of mean noise values corresponding to the pixels within the OFF subset.

The computing device 104 may generate weighting frames that includes weight values based on the noise frames and the mean noise values. Each of the weight values may be based on the corresponding noise mean value and the corresponding noise values. Each of the weighting frames may correspond to a different frame of the frames 107. In addition, each weighting frame may include the weight values of the corresponding pixels.

The computing device 104 may generate detection frames that include detection values based on the corresponding weight values. The computing device 104 may determine a size of the gas plume 110 within each of the frames 107 based on the corresponding detection frames. The computing device 104 may determine the POD of the gas plume 110 within the scene 106 by the user based on the size of the gas plume 110 relative to a size of the scene 106.

Figure 2:
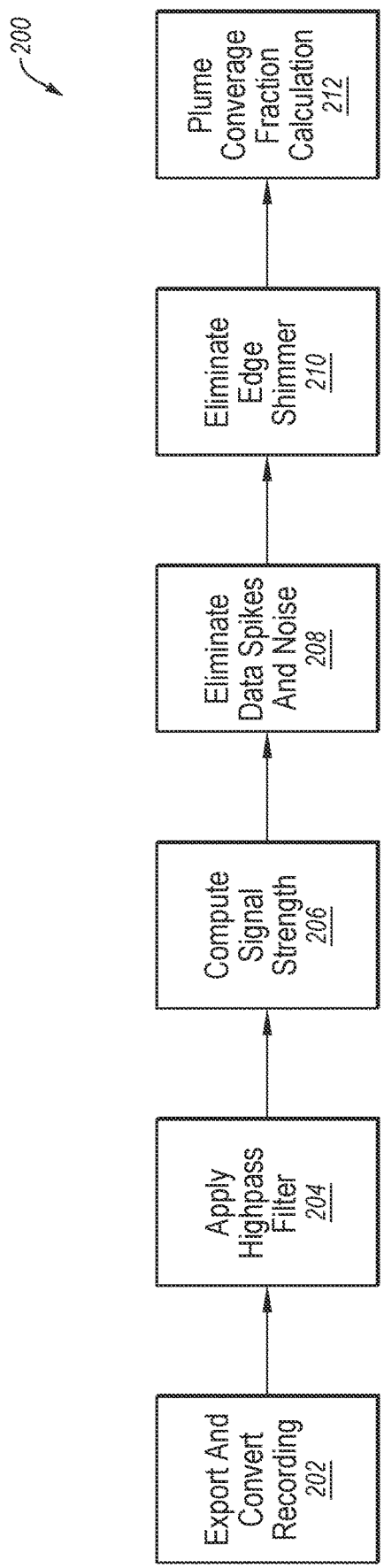
FIG. 2 illustrates a flowchart of an example method to determine a plume coverage fraction (PCF)

FIG. 2 illustrates a flowchart of an example method 200 to determine a PCF, in accordance with at least one embodiment described in the present disclosure. The method 200 may be performed by any suitable system, apparatus, or device with respect to determining the PCF of a gas plume within a scene. For example, the computing device 104 of FIG. 1. may perform or direct performance of one or more of the operations associated with the method 200 with respect to determining the PCF of the gas plume 110 of FIG. 1. The method 200 may include one or more blocks 202, 204, 206, 208, 210, or 212. Although illustrated with discrete blocks, the steps and operations associated with one or more of the blocks of the method 200 may be divided into additional blocks, combined into fewer blocks, or eliminated, depending on the particular implementation.

At block 202, the computing device 104 may export and convert recordings. The computing device 104 may receive the video data 105 from the camera 102. In some embodiments, the computing device 104 may generate the frames 107 based on the video data and in a format that permits the computing device 104 to perform the other operations of the method 200.

At block 204, the computing device 104 may apply a high pass filter. The computing device 104 may apply the high pass filter along the time axis of the frames 107 to filter each pixel separately in the time direction. The computing device 104 may apply the filter to separate pixels that correspond to the high-frequency IR changes between the frames 107 from pixels that correspond to the low-frequency IR changes between the frames 107. In some embodiments, the computing device 104 may filter out the pixels that correspond to the low-frequency IR changes from each of the frames 107 to generate the filtered frames. Each filtered frame may correspond to a different frame of the frames 107. Each of the filtered frames may include filtered values corresponding to different pixels of a corresponding frame of the frames 107.

The computing device 104 may apply the high pass filter pixel by pixel over the frames 107 (e.g., in the time direction) to generate the filtered frames. The computing device 104 may filter out the pixels from the frames 107 that correspond to the low-frequency IR changes by setting the corresponding filtered values equal to zero. A bandwidth of a time domain signal of the high pass filter may include 2.5 hertz for a ten frames per second frame rate. The high pass filter may include zero frequency dependent phase shift during filtering. In some embodiments, the high pass filer may include a Kaiser window finite impulse response (FIR) filter. In some embodiments, the high pass filter may include a cutoff frequency equal to or between two hertz (Hz) and 2.5 Hz, a steepness of 0.85, a stopband attenuation of sixty decibels (dB), or some combination thereof. In some embodiments, a filtered value greater than zero may correspond to the high-frequency IR changes and a filtered value equal to zero may correspond to the low-frequency IR changes.

At block 206, the computing device 104 may compute a signal strength. In some embodiments, the computing device 104 may determine the signal strength value of each pixel based on the corresponding filtered values. The computing device 104 may determine the signal strength of each of the pixels by determining the standard deviation of the filtered values of the corresponding pixels over a subset of the filtered frames. In some embodiments, the computing device 104 may calculate the signal strength value of the pixels according to Equation 1.

$$\sigma(F_{i,j,(k)}) \quad \{k\} = k \ldots k+L \qquad \text{Equation 1}$$

In Equation 1, $\sigma$ represents the standard deviation operator, $F_{i,j,(k)}$ represents the filtered values corresponding to current pixels for each of the filtered frames of the subset of the filtered frames, i represents a horizontal axis index of the current pixel, j represents a vertical axis index of the current pixel, k represents a current filtered frame index, and L represents the number of filtered frames to be included in the subset of the filtered frames (e.g., used to calculate the signal strength value (e.g., the standard deviation) of the current pixel). The computing device 104 may generate the strength frames that include the signal strength values. Each of the strength frames may correspond to a different filtered frame. In some embodiments, each of the strength frames may include the signal strength values of the corresponding pixels. In these and other embodiments, the strength frames may include data frames. In some embodiments, a signal strength value greater than zero may correspond to the high-frequency IR changes and a signal strength value equal to zero may correspond to the low-frequency IR changes.

At block 208, the computing device 104 may eliminate data spikes and noise. In some embodiments, objects within the scene 106 (e.g., a flag, a tag flapping in the wind, grass, or any other appropriate object) may move (e.g., due to wind) which may amplify the signal strength values of the corresponding pixels. In some embodiments, the data spikes may include pixels that correspond to movement of objects within the scene (e.g., a flag or animal) that appear to be part of the gas plume 110 within the frames 107, but can be localized and eliminated from the frames 107 at block 208. The computing device 104 may remove (e.g., set a corresponding value equal to zero) any pixels that correspond to the high-frequency IR changes but do not correspond to the gas plume 110. For example, the strength frames may include signal strength values that correspond to these objects, high-frequency noise within the video data 105, or some combination thereof. The computing device 104 may eliminate these data spikes and the noise by zeroing out the signal strength values of the pixels that correspond to these non-gas plume objects to generate blurred frames. Each of the blurred frames may correspond to a different frame of the frames 107. In addition, each blurred frame may include blurred values of the corresponding pixels. In some embodiments, a blurred value greater than zero may correspond to the high-frequency IR changes without the data spike and/or the noise and a blurred value equal to zero may correspond to the low-frequency IR changes, the data spike, and/or the noise.

In some embodiments, the gas plume 110 may exhibit a continuous Gaussian shape in the i direction and the j direction within the frames 107. The computing device 104 may implement a two-dimensional filtering method to the strength frames to filter out the data spikes and/or the noise. The computing device 104 may apply a filter to the strength frames to smooth the blurred values (e.g., smooth the signal strength values). In some embodiments, the filter may include a Gaussian blur filter. In these embodiments, the Gaussian blur filter may include of equal to ten and including a filter size equal to fifteen.

In some embodiments, the computing device 104 may calculate the signal strength value of the pixels within the frames 107 (e.g., the direct signal strength value of the pixels within the frames 107 representative of the detected IR within the scene 106). The computing device 104 may identify the data spikes and/or the noise (e.g., undesired signals) based on an absolute difference between the signal strength values of the pixels within the frames 107 and the corresponding blurred values. The computing device 104 may determine the absolute difference according to Equation 2.

$$|G(S) - S| \qquad \text{Equation 2}$$

In Equation 2, G(S) represents the blurred value of a corresponding pixel within a current blurred frame and S represents the signal strength value of a corresponding pixel within a corresponding frame of the frames 107.

In response to the absolute difference between the blurred value of a pixel and the signal strength value of the corresponding pixel within the frames 107 being greater than a strength threshold value, the computing device 104 may identify the corresponding pixel as corresponding to the data spike and/or the noise and may set the corresponding blurred value equal to zero. In addition, in response to the signal strength value of a pixel within the frames 107 being less than a noise threshold value, the computing device 104 may identify the pixel as corresponding to the data spike and/or the noise and may set the corresponding blurred value equal to zero. Further, in response to the absolute difference between the blurred value of a pixel and the signal strength value of the corresponding pixel within the frames 107 being less than or equal to the strength threshold value and greater than the noise threshold value, the computing device 104 may set the corresponding blurred value equal to the signal strength value of the corresponding pixel within the frames 107. In some embodiments, the strength threshold value may be equal to or between 0.05 and 0.2. In these and other embodiments, the noise threshold value may be equal to 0.05. In some embodiments, a blurred value greater than zero may correspond to the high-frequency IR changes and a blurred value equal to zero may correspond to the low-frequency IR changes.

At block 210, the computing device 104 may eliminate edge shimmer. Infrastructure components of the natural gas supply line often include components that are cylindrical (e.g., piping). The surface areas of the infrastructure components may shimmer in the video data 105 due to random, high-frequency variations in reflected IR, direct IR, camera vibration, or any other appropriate factor.

The computing device 104 may compare each of the blurred values to the noise threshold value to generate noise frames. Each noise frame may correspond to a different frame of the frames 107. Each of the noise frames may include the noise values of corresponding pixels. The computing device 104, in response to a blurred value being greater than the noise threshold value, may set the corresponding noise value equal to one. Alternatively, the computing device 104, in response to a blurred value being less than or equal to the noise threshold value, may set the corresponding noise value equal to zero.

The computing device 104, within the OFF subset, may calculate mean noise values of the noise values over the noise frames (e.g., in the k direction). Each of the mean noise values may represent the mean value of the corresponding noise values throughout the noise frames corresponding to the OFF subset.

The computing device 104 may generate a weighting frame (e.g., a weighting matrix) for each noise frame. Each of the weighting frames may correspond to a different frame of the frames 107. In addition, each of the weighting frames may include weight values of the corresponding pixels. The weight values may be based on corresponding mean noise values and corresponding noise values. The computing device 104 may determine the weight values according to Equation 3.

$$(1 - \overline{I}_{i,j}) \cdot I_{i,j,k} \text{ for } k = 1 \ldots N \quad \text{Equation 3}$$

In Equation 3, $\overline{I}_{i,j}$ represents a current mean noise value and $I_{i,j,k}$ represents the corresponding noise values.

At block 212, the computing device 104 may calculate the PCF. The computing device 104 may generate a detection frame for each of the weighting frames. Each of the detection frames may correspond to a different frame of the frames 107. Each of the detection frames may include detection values of corresponding pixels. In some embodiments, the computing device 104 may compare the weight values to a shimmer threshold value to generate the detection frames. In response to a current weight value being greater than the shimmer threshold value, the computing device 104 may set the corresponding detection value equal to one. Alternatively, in response to a current weight value being equal to or less than the shimmer threshold value, the computing device 104 may set the corresponding detection value equal to zero. The shimmer threshold value may be equal to or between 0.1 and one. For example, the shimmer threshold value may be equal to 0.95.

The computing device 104 may determine the size of the gas plume 110 in each of the frames 107 based on a number of detection values within a corresponding detection frame that are greater than zero. In some embodiments, the computing device 104 may determine a number of detection values that are greater than zero for each detection frame.

The computing device 104 may compare the number of detection values that are greater than zero in each detection frame (e.g., the size of the gas plume 110 within each of the frames 107) to a total number of detection values of the corresponding detection frame (e.g., a total size of the corresponding frame of the frames 107). In some embodiments, the computing device 104 may determine, for each of the frames 107, a ratio of a number of corresponding plume pixels (e.g., the pixels that correspond to the gas plume 110) and a total number of corresponding non-plume pixels (e.g., a total number of pixels within the corresponding frame).

In some embodiments, the plume pixels may include pixels that correspond to a detection value equal to one in the corresponding detection frame. In addition, the non-plume pixels may include pixels that correspond to a detection value equal to zero in the corresponding detection frame. The computing device 104, for each of the frames 107, may determine a ratio of the number of plume pixels compared to the number of non-plume pixels. The size of the gas plume 110 for each of the frames 107 may be based on the corresponding ratio of the number of plume pixels compared to the number of non-plume pixels.

The computing device 104 may generate a vector of PCF values. Each PCF value may correspond to a different frame of the frames 107. The computing device 104 may determine a PCF for the scene 106 based on the PCF values. The PCF may be equal to the mean of the PCF values, which may represent an average size of the gas plume 110 relative the scene 106 (e.g., a fraction of the scene 106 corresponding to the gas plume 110) throughout the frames 107.

Modifications, additions, or omissions may be made to the method 200 without departing from the scope of the present disclosure. For example, the operations of method 200 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 3:
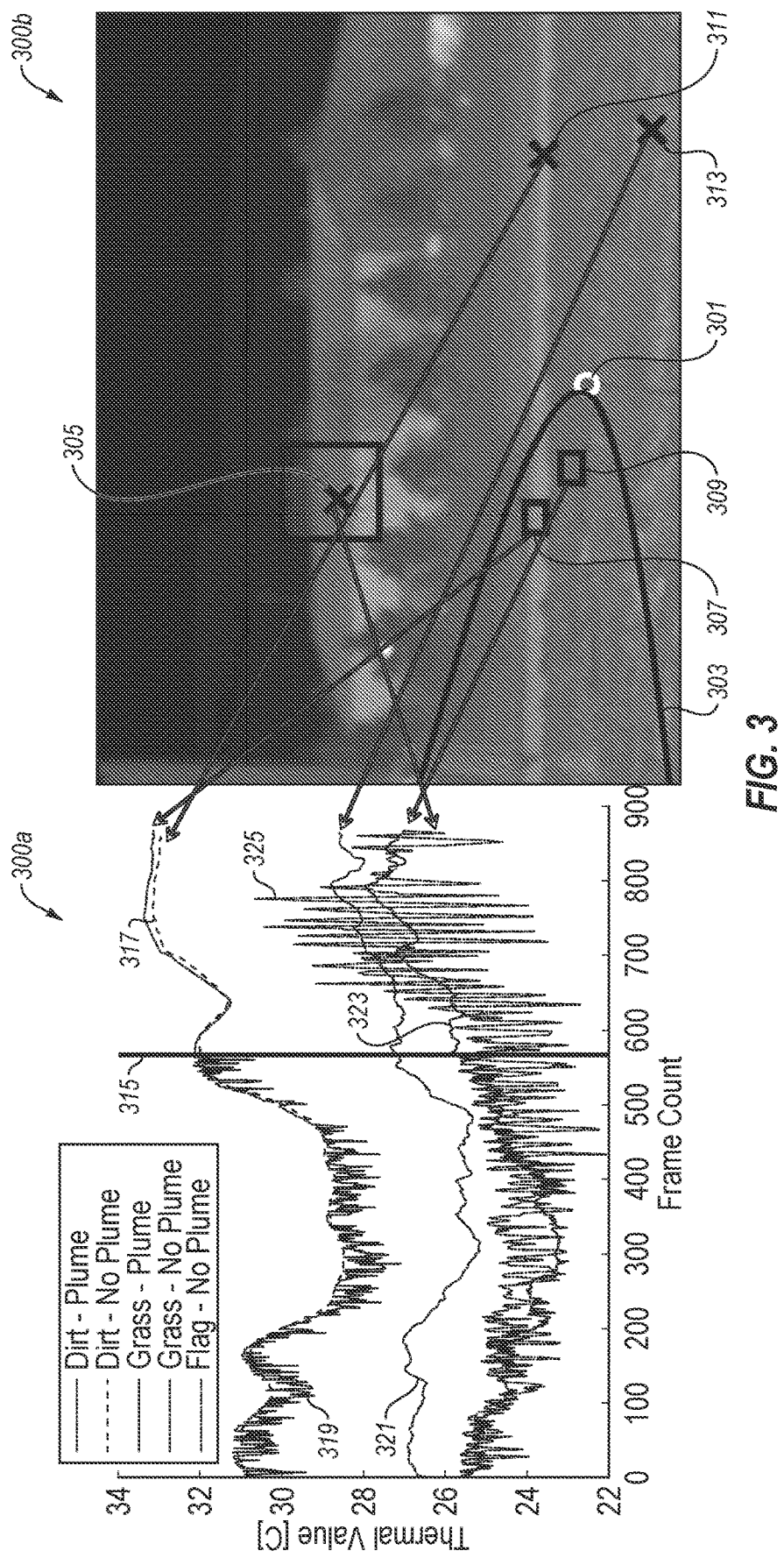
FIG. 3 illustrates a graphical representation of an exemplary frame of a scene and measured temperature readings of various pixels within the scene.

FIG. 3 illustrates a graphical representation 300*a* of temperature readings of pixels within frames representative of a scene, in accordance with at least one embodiment described in the present disclosure. The curves within the graphical representation 300*a* illustrate measured temperatures of five pixels within the frames (e.g., five locations within the scene) over a period of time.

An exemplary frame 300*b* illustrates apparent temperatures at a moment in time within the period of time. Darker colors within the frame 300*b* indicate colder relative apparent temperatures and lighter colors within the frame 300*b* indicate warmer relative apparent temperatures. The apparent temperature of the objects within the frame 300*b* are illustrated in FIG. 3 as being equal to or between 13.9 degrees Celsius and forty-eight degrees Celsius.

A circle 301 indicates a pixel corresponding to an emission point (e.g., a gas source) of a gas plume within the scene. The gas plume is illustrated as roughly being enclosed in the frame 300*b* by curve 303 and the boundaries of the frame 300*b*. A box 305 indicates a pixel corresponding to the location of a flag within the scene. Due to wind during the period of time, the flag moved and created high-frequency IR changes (e.g., data spikes and/or noise) as illustrated in the graphical representation 300*a*. A box 307 indicates a pixel corresponding to the location of a reflective road within an area of the frame 300*b* corresponding to the gas plume (e.g., visible through the gas plume). Another box 309 indicates a pixel corresponding to the location of grass within the area of the frame 300*b* corresponding to the gas plume. An "X" 311 indicates a pixel corresponding to the location of the reflective road within the frame 300*b* but outside the area corresponding to the gas plume. Another "X" 313 indicates a location of grass within the frame 300*b* but outside the area corresponding to the gas plume. Due to wind during the period of time, the grass moved and created high-frequency IR changes (e.g., data spike and/or noise) as illustrated in the graphical representation 300*a*.

In the graphical representation 300*a*, curve 315 represents a point in time in which the gas plume was shut off (e.g., the gas plume was no longer being emitted). The portion of the graphical representation 300*a* to the left of the curve 315 represents the frames of the ON subset. The portion of the graphical representation 300a to the right of the curve 315 represents the frames of the OFF subset. Curve 317 represents the measured temperature of the road outside the area corresponding to the gas plume (e.g., the X 311). Curve 319 represents the measured temperature of the road within the area corresponding to the gas plume (e.g., the box 307). Curve 321 represents the measured temperature of the grass outside the area corresponding to the gas plume (e.g., the X 313). Curve 323 represents the measured temperature of the grass within the area corresponding to the gas plume (e.g., the box 309). Curve 325 represents the measured temperature of the flag (e.g., the box 305).

As illustrated in the graphical representation 300a, the locations within the area corresponding to the gas plume exhibited high-frequency IR changes between the frames (e.g., high-frequency temperature changes) during the period of time. Meanwhile, as illustrated in the graphical representation 300a, the locations outside the area corresponding to the gas plume, except the flag (e.g., curve 325), exhibited low-frequency IR changes between the frames (e.g., exhibited temperature changes of roughly plus minus two degrees Celsius) during the period of time.

Figure 4:
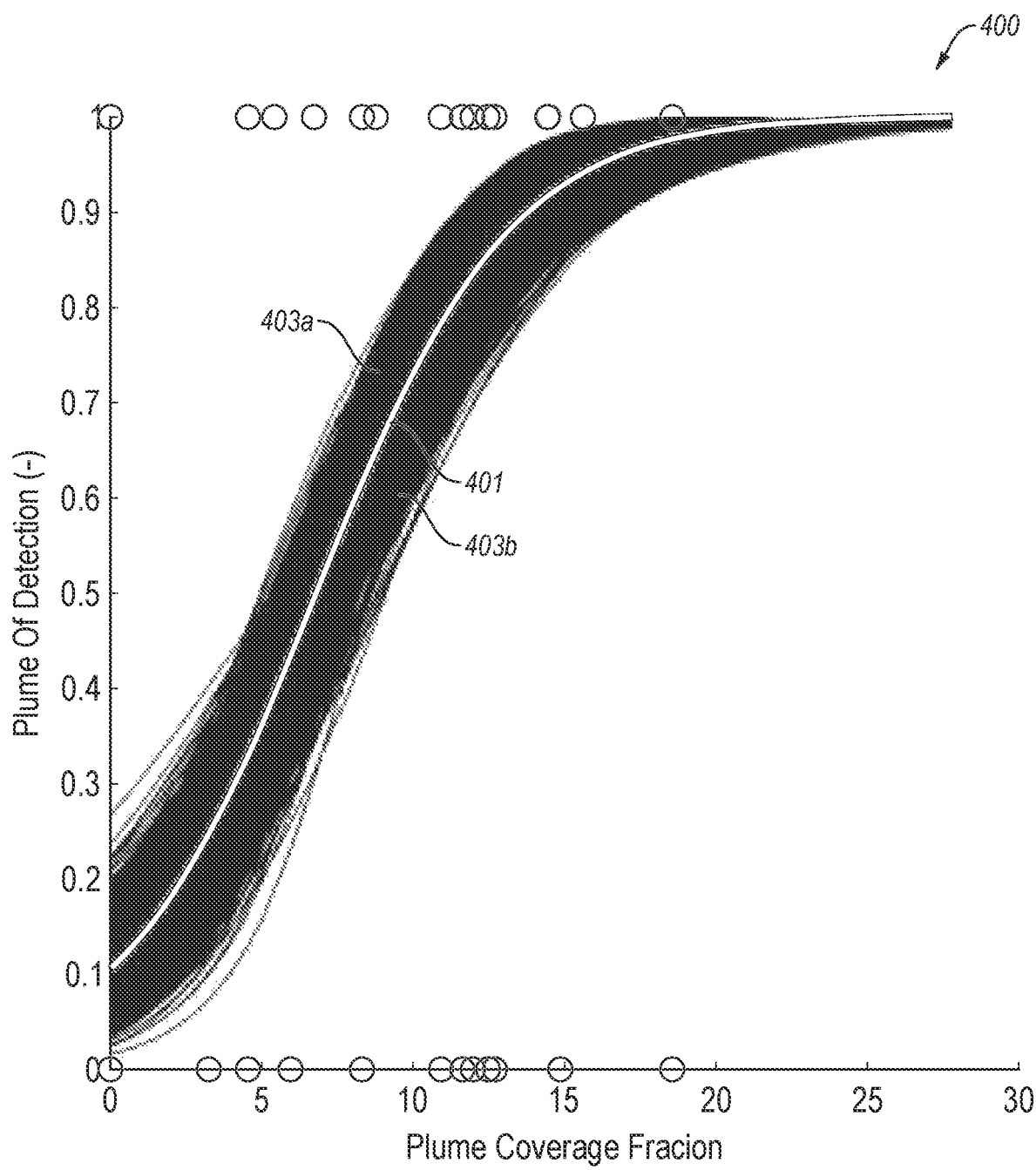
FIG. 4 illustrates a graphical representation of simulations.

FIG. 4 illustrates a graphical representation 400 of a simulation of the probability of detection of a gas plume within a scene versus the PCF, in accordance with at least one embodiment described in the present disclosure. The graphical representation 400 indicates the POD of the gas plume increases as the PCF increases (e.g., as the size of the gas plume increases). For the simulation, logistic parameters of $\beta_1=-2.13$ and $\beta_2=0.313$ and a bootstrap iteration setting of one thousand were used to obtain a logistic regression of the POD.

Curve 401 represents the logistic regression of the PCF determined as described in the present disclosure. Curves 403a,b represent a ninety percent confidence interval around ninety percent POD. As illustrated in the graphical representation, a relationship between the POD and the PCF exists indicating that the PCF may be used to determine the POD of the gas plume without human intervention.

Figure 5:
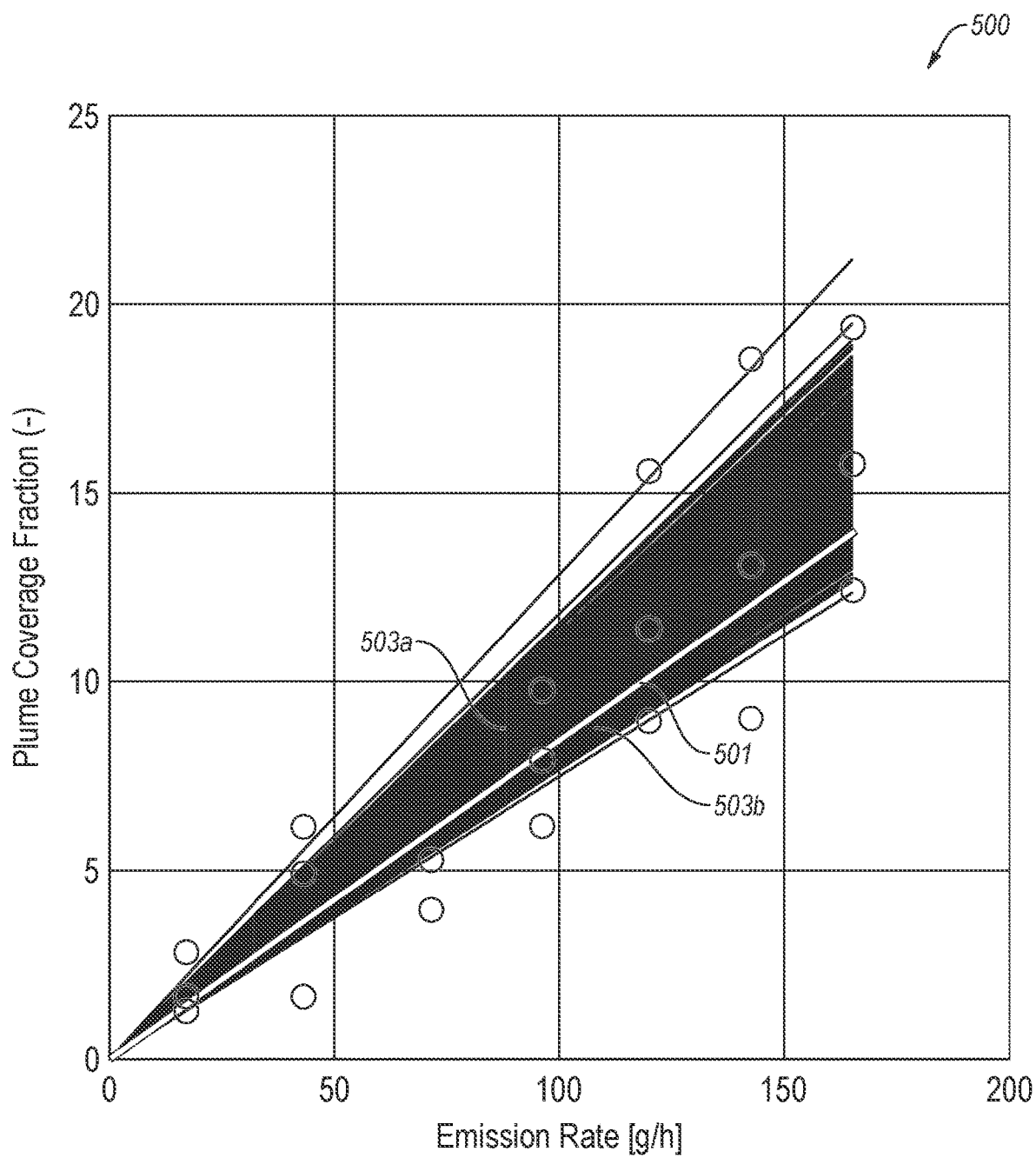
FIG. 5 illustrates a graphical representation of simulations.

FIG. 5 illustrates a graphical representation 500 of a simulation of the emission rate of a gas plume within a scene versus the PCF, in accordance with at least one embodiment described in the present disclosure. The graphical representation 500 indicates a linear relationship exists between the emission rate of the gas plume and the PCF determined as described in the present disclosure of a distance up to two meters. Curve 501 represents the linear regression of the PCF overlaid a linear regression 503a,b.

Figure 6:
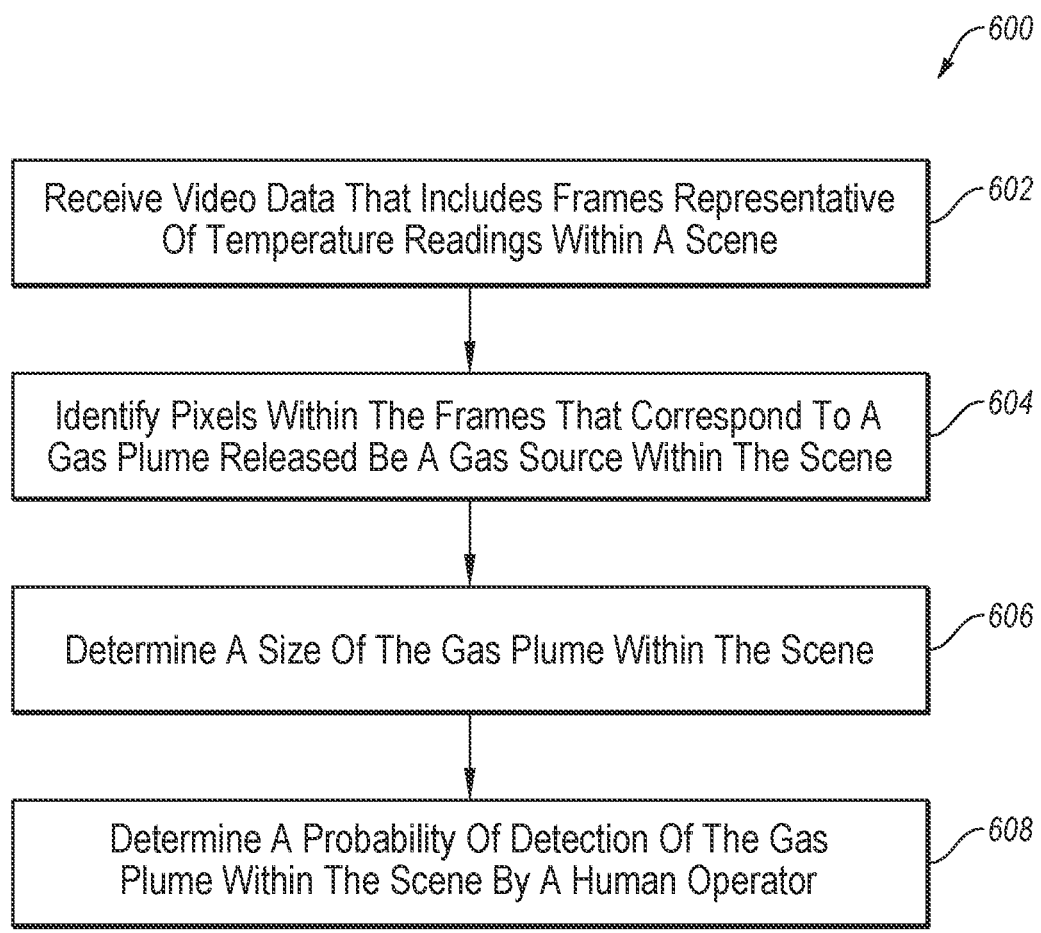
FIG. 6 illustrates a flowchart of an example method to determine the POD of the gas plume within the scene.

FIG. 6 illustrates a flowchart of an example method to determine the POD of the gas plume within the scene, in accordance with at least one embodiment described in the present disclosure. The method 600 may be performed by any suitable system, apparatus, or device with respect to determining the mask leakage rate of the mask. For example, the computing device 104 of FIG. 1 may perform or direct performance of one or more of the operations associated with the method 600 with respect to determining the POD of the gas plume within the scene. The method 600 may include one or more blocks 602, 604, 606, or 608. Although illustrated with discrete blocks, the steps and operations associated with one or more of the blocks of the method 600 may be divided into additional blocks, combined into fewer blocks, or eliminated, depending on the particular implementation.

At block 602, vide data that includes frames representative of IR within the scene may be received. At block 604, pixels within the frames that correspond to a gas plume released by a gas source within the scene may be identified. The pixels within the frames that correspond to a gas plume released by a gas source within the scene may be identified based on the IR. At block 606, a size of the gas plume within the scene may be determined. The size of the gas plume within the scene may be determined based on the identified pixels. At block 608, a POD of the gas plume within the scene by a user may be determined. The POD of the gas plume within the scene by the user may be determined based on the size of the gas plume Modifications, additions, or omissions may be made to the method 600 without departing from the scope of the present disclosure. For example, the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 7:
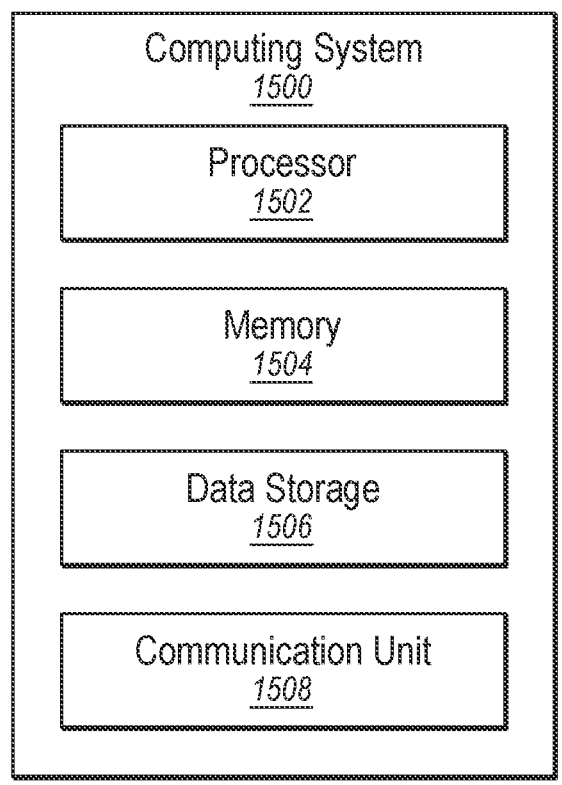
FIG. 7 illustrates a block diagram of an example computing system, all according to at least one embodiment described in the present disclosure.

FIG. 7 illustrates a block diagram of an example computing system 1500, according to at least one embodiment of the present disclosure. The computing system 1500 may be configured to implement or direct one or more operations associated with the computing device 104 of FIG. 1. The computing system 1500 may include a processor 1502, a memory 1504, a data storage 1506, and a communication unit 1508. The processor 1502, the memory 1504, the data storage 1506, and the communication unit 1508 may be communicatively coupled.

In general, the processor 1502 may include any suitable special-purpose or general-purpose computer, computing entity, or processing device including various computer hardware or software modules and may be configured to execute instructions stored on any applicable computer-readable storage media. For example, the processor 1502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 7, the processor 1502 may include any number of processors configured to, individually or collectively, perform or direct performance of any number of operations described in the present disclosure. Additionally, one or more of the processors may be present on one or more different electronic devices, such as different servers.

In some embodiments, the processor 1502 may be configured to interpret and/or execute program instructions and/or process data stored in the memory 1504, the data storage 1506, or the memory 1504 and the data storage 1506. In some embodiments, the processor 1502 may fetch program instructions from the data storage 1506 and load the program instructions in the memory 1504. After the program instructions are loaded into memory 1504, the processor 1502 may execute the program instructions.

The memory 1504 and the data storage 1506 may include computer-readable storage media for carrying or having computer-executable instructions or data structures stored thereon. Such computer-readable storage media may include any available media that may be accessed by a general-purpose or special-purpose computer, such as the processor 1502. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1502 to perform a certain operation or group of operations.

The communication unit 1508 may include any component, device, system, or combination thereof that is configured to transmit or receive information over a network. In some embodiments, the communication unit 1508 may communicate with other devices at other locations, the same location, or even other components within the same system. For example, the communication unit 1508 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 1508 may permit data to be exchanged with a network and/or any other devices or systems described in the present disclosure. For example, when the computing system 1500 is included in the computing device 104 of FIG. 1, the communication unit 1508 may allow the computing device 104 to communicate with the camera 102 of FIG. 1 or an external computing device via a network.

Modifications, additions, or omissions may be made to the computing system 1500 without departing from the scope of the present disclosure. For example, in some embodiments, the computing system 1500 may include any number of other components that may not be explicitly illustrated or described.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

The invention claimed is:

1. A method comprising:
receiving video data comprising a plurality of frames representative of infrared radiation (IR) within a scene, each frame of the plurality of frames comprising a plurality of pixels;
identifying high-frequency changes in temperature within the scene due to motion of a gas plume released by a gas source within the scene, wherein identifying the high-frequency changes in temperature includes identifying pixels within the plurality of frames that correspond to the gas plume released by the gas source within the scene based on the IR; and
determining a size of the gas plume within each frame based on the identified pixels;
wherein the method further comprises:
filtering out, from each frame, pixels that correspond to low-frequency changes in temperature to generate a plurality of filtered frames, each filtered frame comprising a plurality of filtered values;
calculating a signal strength value of each pixel based on the plurality of filtered frames according to:

$$\sigma(F_{i,j,\{k\}}) \quad \{k\} = k \ldots k+L$$

in which, $\sigma$ represents a standard deviation operator, $F_{i,j,(k)}$ represents the filtered values corresponding to current pixels of a subset of the plurality of filtered frames, i represents a horizontal axis index of the current pixels, j represents a vertical axis index of the current pixels, k represents a current filtered frame index, and L represents a number of the plurality of filtered frames to be included in the subset of the filtered frames; and
generating a plurality of strength frames, each strength frame corresponding to a different frame of the plurality of frames and each strength frame comprising the signal strength values of corresponding pixels, wherein the pixels identified within the plurality of frames that correspond to the gas plume are identified based on the corresponding signal strength value.

2. The method of claim 1 further comprising:
determining a number of pixels within each frame that correspond to the gas plume, wherein the size of the gas plume within each frame is determined based on the number of pixels within each frame that correspond to the gas plume; and
determining a probability of detection of the gas plume within the scene by a user based on the size of the gas plume within each frame.

3. The method of claim 1 further comprising filtering out, from each frame, pixels that correspond to low-frequency changes in temperature to generate a plurality of filtered frames, wherein the pixels identified within the plurality of frames that correspond to the gas plume comprise the pixels that correspond to high-frequency changes in temperature within the plurality of frames.

4. The method of claim 1, further comprising:
applying a filter to the plurality of strength frames to generate a plurality of blurred frames, each blurred frame comprising a plurality of blurred values representative of a smoothed version of corresponding signal strength values;
calculating a signal strength value of each pixel within the plurality of frames;
determining an absolute difference between the signal strength value and the corresponding blurred value for each pixel;
responsive to the absolute difference between the signal strength value and the corresponding blurred value of a pixel being greater than a strength threshold value, identifying the pixel as corresponding to a data spike and setting the corresponding blurred value equal to zero; and
responsive to the signal strength value of a pixel within the plurality of frames being less than a noise threshold value, identifying the pixel as corresponding to the data spike and setting the corresponding blurred value equal to zero, wherein the pixels identified within the plurality of frames that correspond to the gas plume correspond to pixels within the plurality of filtered frames that correspond to a signal strength value greater than zero.

5. The method of claim 4, wherein the plurality of frames comprise an OFF subset corresponding to a period of time in which the gas source is not releasing the gas plume, the method further comprising:
comparing the plurality of blurred values to the noise threshold value to generate a plurality of noise frames, each noise frame corresponding to a different frame of the plurality of frames and each noise frame comprising a plurality of noise values;
calculating a mean noise value of the plurality of pixels within the OFF subset based on the corresponding noise values to generate a matrix of mean noise values;
generating a weighting frame comprising a plurality of weight values, wherein each of the weight values is based on the corresponding mean noise value and the corresponding noise values; and
generating a detection frame comprising a plurality of detection values, wherein each detection value of the plurality of detection values is based on the corresponding weight value, wherein the pixels identified within the plurality of frames that correspond to the gas plume comprise pixels that correspond to a detection value greater than zero.

6. The method of claim 5 further comprising:
determining a number of plume pixels, wherein the plume pixels comprise pixels that correspond to a detection value greater than zero;
determining a number of non-plume pixels, wherein the non-plume pixels comprise pixels that correspond to a detection value equal to zero; and
determining a ratio of the number of plume pixels compared to the number of non-plume pixels, wherein the size of the gas plume is determined based on the ratio of the number of plume pixels compared to the number of non-plume pixels.

7. A non-transitory computer-readable medium having computer-readable instructions stored thereon that are executable by a processor to perform or control performance of operations comprising:
receiving video data comprising a plurality of frames representative of infrared radiation (IR) within a scene, each frame of the plurality of frames comprising a plurality of pixels;
filtering out, from each frame, pixels that correspond to low-frequency changes in temperature;
identifying pixels within the plurality of frames that correspond to a gas plume released by a gas source within the scene based on the IR, the pixels identified within the plurality of frames that correspond to the gas plume comprising pixels that correspond to high-frequency changes in temperature within the plurality of frames;
determining a size of the gas plume within each frame based on the identified pixels; and
determining a probability of detection of the gas plume within the scene by a user based on the size of the gas plume within each frame;
wherein the filtering out, from each frame, of pixels that correspond to low-frequency changes in temperature generates a plurality of filtered frames, each filtered frame comprising a plurality of filtered values, the operations further comprising:
calculating a signal strength value of each pixel based on the plurality of filtered frames according to:

$$\sigma(F_{i,j,(k)}) \quad \{k\} = k \ldots k+L$$

in which, $\sigma$ represents a standard deviation operator, $F_{i,j,(k)}$ represents the filtered values corresponding to current pixels of a subset of the plurality of filtered frames, i represents a horizontal axis index of the current pixels, j represents a vertical axis index of the current pixels, k represents a current filtered frame index, and L represents a number of the plurality of filtered frames to be included in the subset of the filtered frames; and
generating a plurality of strength frames, each strength frame corresponding to a different frame of the plurality of frames and each strength frame comprising the signal strength values of corresponding pixels, wherein the pixels identified within the plurality of frames that correspond to the gas plume are identified based on the corresponding signal strength value.

8. The non-transitory computer-readable medium of claim 7, the operations further comprising determining a number of pixels within each frame that correspond to the gas plume, wherein the size of the gas plume within each frame is determined based on the number of pixels within each frame that correspond to the gas plume.

9. The non-transitory computer-readable medium of claim 7, the operations further comprising:
applying a filter to the plurality of strength frames to generate a plurality of blurred frames, each blurred frame comprising a plurality of blurred values representative of a smoothed version of corresponding signal strength values;
calculating a signal strength value of each pixel within the plurality of frames;
determining an absolute difference between the signal strength value and the corresponding blurred value for each pixel;
responsive to the absolute difference between the signal strength value and the corresponding blurred value of a pixel being greater than a strength threshold value, identifying the pixel as corresponding to a data spike and setting the corresponding blurred value equal to zero; and
responsive to the signal strength value of a pixel within the plurality of frames being less than a noise threshold value, identifying the pixel as corresponding to the data spike and setting the corresponding blurred value equal to zero, wherein the pixels identified within the plurality of frames that correspond to the gas plume correspond to pixels within the plurality of filtered frames that correspond to a signal strength value greater than zero.

10. The non-transitory computer-readable medium of claim 9, wherein the plurality of frames comprise an OFF subset corresponding to a period of time in which the gas source is not releasing the gas plume, the operations further comprising:
comparing the plurality of blurred values to the noise threshold value to generate a plurality of noise frames, each noise frame corresponding to a different frame of the plurality of frames and each noise frame comprising a plurality of noise values;
calculating a mean noise value of the plurality of pixels within the OFF subset based on the corresponding noise values to generate a matrix of mean noise values;
generating a weighting frame comprising a plurality of weight values, wherein each of the weight values is based on the corresponding mean noise value and the corresponding noise values; and
generating a detection frame comprising a plurality of detection values, wherein each detection value of the plurality of detection values is based on the corresponding weight value, wherein the pixels identified within the plurality of frames that correspond to the gas plume comprise pixels that correspond to a detection value greater than zero.

11. The non-transitory computer-readable medium of claim 10, the operations further comprising:
determining a number of plume pixels, wherein the plume pixels comprise pixels that correspond to a detection value greater than zero;
determining a number of non-plume pixels, wherein the non-plume pixels comprise pixels that correspond to a detection value equal to zero; and
determining a ratio of the number of plume pixels compared to the number of non-plume pixels, wherein the size of the gas plume is determined based on the ratio of the number of plume pixels compared to the number of non-plume pixels.

12. A system comprising:
one or more computer-readable storage media configured to store instructions; and
one or more processors communicatively coupled to the one or more computer-readable storage media and configured to, in response to execution of the instructions, cause the system to perform operations, the operations comprising:
receiving video data comprising a plurality of frames representative of infrared radiation (IR) within a scene, each frame of the plurality of frames comprising a plurality of pixels;
identifying pixels within the plurality of frames that correspond to a gas plume released by a gas source within the scene based on the IR; and
determining a size of the gas plume within each frame based on the identified pixels;
wherein the operations further comprise:
calculating a signal strength value of each pixel based on the plurality of frames according to:

$$\sigma(F_{i,j,\{k\}}) \quad \{k\} = k \ldots k + L$$

in which, $\sigma$ represents a standard deviation operator, $F_{i,j,(k)}$ represents the values corresponding to current pixels of a subset of the plurality of frames, i represents a horizontal axis index of the current pixels, j represents a vertical axis index of the current pixels, k represents a current frame index, and L represents a number of the plurality of frames to be included in the subset of frames, and
generating a plurality of strength frames, each strength frame corresponding to a different frame of the plurality of frames and each strength frame comprising the signal strength values of corresponding pixels, wherein the pixels identified within the plurality of frames that correspond to the gas plume are identified based on the corresponding signal strength value.

13. The system of claim 12, the operations further comprising:
determining a number of pixels within each frame that correspond to the gas plume, wherein the size of the gas plume within each frame is determined based on the number of pixels within each frame that correspond to the gas plume and
determining a probability of detection of the gas plume within the scene by a user based on the size of the gas plume within each frame.

14. The system of claim 12, the operations further comprising filtering out, from each frame, pixels that correspond to low-frequency changes in temperature to generate a plurality of filtered frames, wherein the pixels identified within the plurality of frames that correspond to the gas plume comprise the pixels that correspond to high-frequency changes in temperature within the plurality of frames.

15. The system of claim 12, the operations further comprising:
applying a filter to the plurality of strength frames to generate a plurality of blurred frames, each blurred frame comprising a plurality of blurred values representative of a smoothed version of corresponding signal strength values;
calculating a signal strength value of each pixel within the plurality of frames;

determining an absolute difference between the signal strength value and the corresponding blurred value for each pixel;

responsive to the absolute difference between the signal strength value and the corresponding blurred value of a pixel being greater than a strength threshold value, identifying the pixel as corresponding to a data spike and setting the corresponding blurred value equal to zero; and responsive to the signal strength value of a pixel within the plurality of frames being less than a noise threshold value, identifying the pixel as corresponding to the data spike and setting the corresponding blurred value equal to zero, wherein the pixels identified within the plurality of frames that correspond to the gas plume correspond to pixels within the plurality of frames that correspond to a signal strength value greater than zero.

16. The system of claim 15, wherein the plurality of frames comprise an OFF subset corresponding to a period of time in which the gas source is not releasing the gas plume, the operations further comprising:

comparing the plurality of blurred values to the noise threshold value to generate a plurality of noise frames, each noise frame corresponding to a different frame of the plurality of frames and each noise frame comprising a plurality of noise values;

calculating a mean noise value of the plurality of pixels within the OFF subset based on the corresponding noise values to generate a matrix of mean noise values;

generating a weighting frame comprising a plurality of weight values, wherein each of the weight values is based on the corresponding mean noise value and the corresponding noise values; and generating a detection frame comprising a plurality of detection values, wherein each detection value of the plurality of detection values is based on the corresponding weight value, wherein the pixels identified within the plurality of frames that correspond to the gas plume comprise pixels that correspond to a detection value greater than zero.

* * * * *

UNITED STATES PATENT AND TRADEMARK OFFICE
CERTIFICATE OF CORRECTION

PATENT NO. : 12,469,250 B2
APPLICATION NO. : 18/559779
DATED : November 11, 2025
INVENTOR(S) : Daniel Zimmerle and Marcus Martinez Page 1 of 1

It is certified that error appears in the above-identified patent and that said Letters Patent is hereby corrected as shown below:

On the Title Page

Item (57), Line 3, replace "pixels The" with -- pixels. The --.

In the Specification

In Column 1, Line 29, replace "has" with -- have --.

In Column 11, Line 66, replace "vide" with -- video --.

Signed and Sealed this
Thirteenth Day of January, 2026

John A. Squires
*Director of the United States Patent and Trademark Office*